July 25, 1950 J. HAMMOND 2,516,116

PHONOGRAPH RECORD FILE AND CABINET

Filed April 26, 1946 2 Sheets-Sheet 1

Inventor
Joseph Hammond
Andrew F. Wintercorn
Atty

July 25, 1950 J. HAMMOND 2,516,116

PHONOGRAPH RECORD FILE AND CABINET

Filed April 26, 1946 2 Sheets-Sheet 2

Inventor
Joseph Hammond
Andrew F. Wintercorn
Atty

Patented July 25, 1950

2,516,116

UNITED STATES PATENT OFFICE 2,516,116

PHONOGRAPH RECORD FILE AND CABINET

Joseph Hammond, Rockford, Ill.

Application April 26, 1946, Serial No. 665,255

9 Claims. (Cl. 312—12)

This invention relates to a new and improved phonograph record file and cabinet for use with disc records.

The principal object of my invention is to provide a phonograph record file in which the envelopes containing the records are mounted in a support that is comparable to a loose-leaf binder, the same having a back carried on a bottom piece and having hinged side pieces that are adapted to swing outwardly away from one another like the covers of a book or loose-leaf binder when the file is tilted rearwardly, thus making the envelopes which contain the phonograph records fan out like the leaves of a book so that the titles on the records may be easily read and one may quickly and easily select or find any record or records out of a large group.

Another important object is to provide a record file of the kind mentioned in which the bottom piece is tiltably mounted on a base in such a way that the weight of the records is near enough to the point of balance in relation to the fulcrum axis so that it requires very little effort to tilt the file to the reclining position for easy access to the records. In a modified form a bottom piece has arcuate members thereon that are rotatable in arcuate runways in a support so that the weight of the records does not have to be lifted much if at all in tilting the record file to the reclining position.

Still another object is to provide a tiltable record file of the kind described in which the base carries suitable pneumatic checking devices connected to the bottom piece of the file to eliminate shock and jar in the tilting of the file and reduce likelihood of a person pinching his fingers between the bottom piece of the file and reduce likelihood of a person pinching his fingers between the bottom piece of the file and the base.

Still another object is to provide a cabinet for a record file of the kind described in which the door is hinged to swing downwardly to form a support for the file in its extended position and has downwardly swingable legs to assume the load when the record file is pulled out of the cabinet onto the top of the extended door, tracks being suitably provided on the floor of the cabinet compartment and on the inside of the door on which rollers provided on the base of the file are adapted to run for easy movement of the file to and from its retracted position.

Still another object is to provide a record file of the kind described in which novel hold-backs are provided for holding a specified number of empty spare envelopes out of the way so as not to interfere with the easy handling of the other envelopes that contain records in the selection of records.

The invention is illustrated in the accompanying drawing, in which.

Similar reference numerals are applied to corresponding parts throughout the views.

Figure 2:
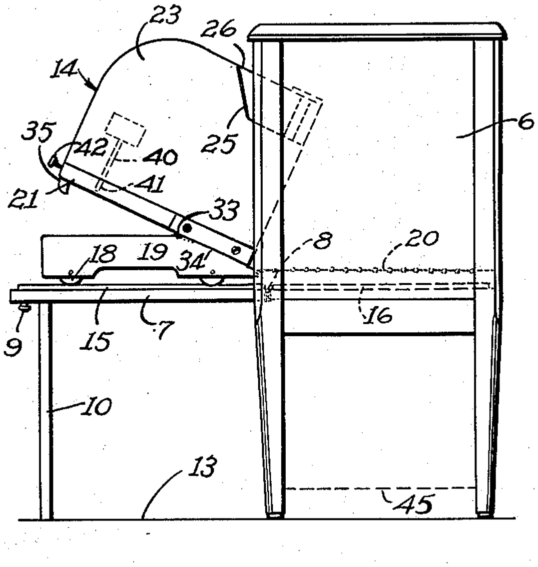
Fig. 2 is a side view of the cabinet showing the door swung open and supported by its two legs and supporting the record file in its extended operative position.
Figure 3:
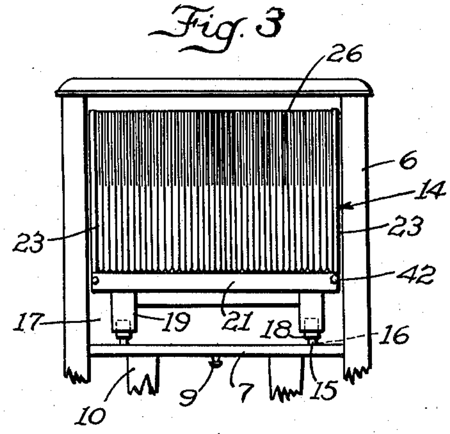
Fig. 3 is a front view of the cabinet showing the door swung down and showing the record file in its retracted position.
Figure 5:
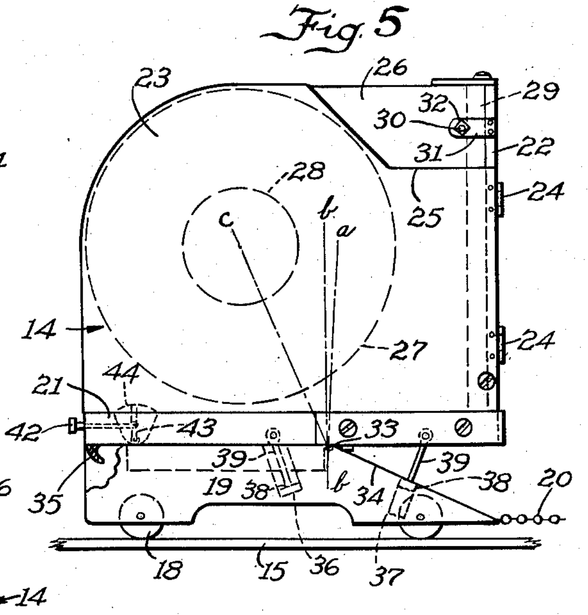
Fig. 5 is a side view of the record file on a larger scale.
Figure 4:
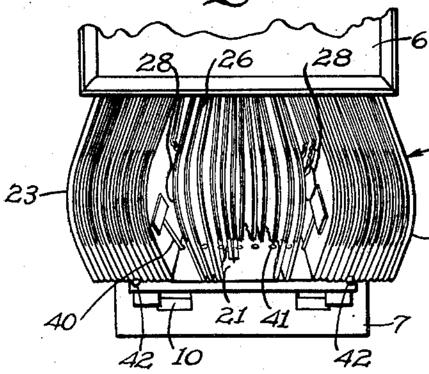
Fig. 4 is a top view of the front portion of Fig. 2 showing how the record file opens like a book and illustrating the hold-backs.
Figure 6:
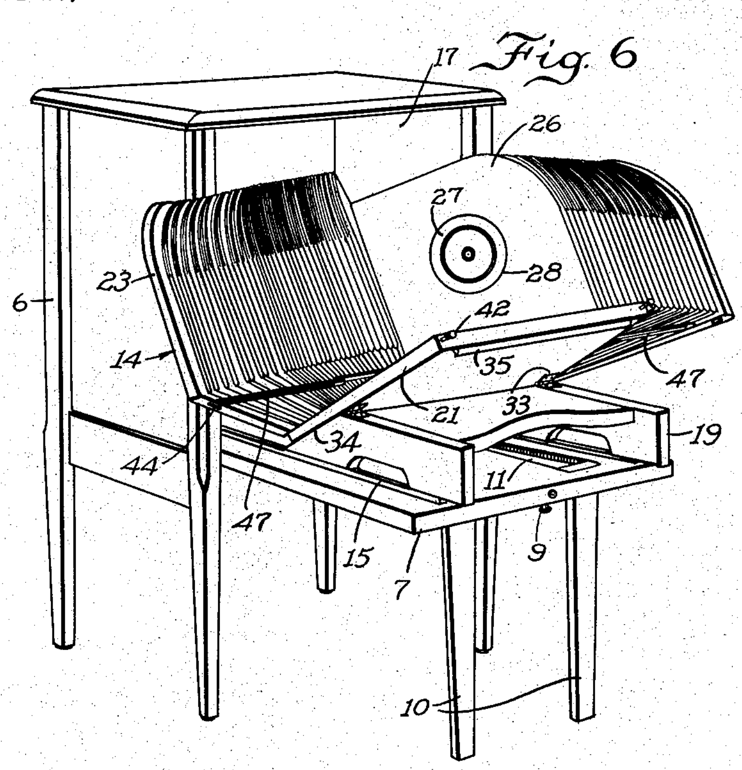
Fig. 6 is a perspective view of the cabinet showing the record file opened for use.

The cabinet 6 has a door 7 hinged, as indicated at 8, to swing downwardly to the substantially horizontal open position shown in Fig. 2, a knob 9 being suitably provided near the top to open the door, and a suitable catch or detent (not shown) being provided to hold the door closed. In some cases a lock may also be provided for the door to prevent unauthorized access to the records. A pair of legs 10 fit in slots 11 in the door and are pivoted on pins 12 to swing downwardly in the opening of the door, to support the door from the floor 13 and assume the load of the record file, indicated generally by the reference numeral 14, when the file is pulled out for use, as illustrated in Fig. 2. Two tracks 15 provided on the inner side of the door are aligned with two tracks 16 provided on the floor of the cabinet compartment 17, and rollers 18 provided on the carriage or base 19 of the record file 14 run on these tracks to facilitate the movement of the record file 14 into and out of the cabinet. A stop or stops may be provided to limit outward movement of the file 14 on the tracks. A chain or other flexible connection 20 is shown between the back wall of the cabinet compartment and the base 19 to limit the movement of the record file so that there will be no danger of its being pulled out too far. Any suitable means may be provided for locking the file 14 by means of its base 19 releasably in its extended position. The record file 14 comprises a bottom-piece 21, a back-piece 22 rigidly secured to the rear end of the bottom-piece in substantially right angle relationship and side-pieces 23 hinged at their rear ends, as indicated at 24, to the back-piece 22 to swing outwardly away from one another like the covers of a book. The upper rear corner of the side-pieces 23 are cut away as shown at 25 to permit opening wider without interference with the sides of the cabinet. The file in a full-size cabinet contains usually about a hundred envelopes 26 which are open on the top and at least part way up the front to permit placing the disc phonograph records 27 in the envelopes easily or removing the same. Circular holes 28 are provided in both sides of the envelopes through which the titles on the records can be read. This type of envelope is well known in this art, and is usually made of manila or other tough paper. In the present case each of the envelopes has a cardboard strip 29 glued between the sides thereof at the back so that when one or more rods 30 are passed through registering holes in the envelopes near the back thereof, in front of the strips 29, to fasten the group of envelopes together, as in a loose-leaf binder, there is no danger of the paper tearing at the holes. The rod 30 is supported at opposite ends on sheet metal brackets 31 that project forwardly from the ends of the back-piece 22, and nuts 32 are preferably threaded on the projecting ends of the rod 30 to lock the rod in place. With this construction, it should be clear that the individual envelopes 26 are free to swing from side to side like the leaves of a book that is standing on end, tilted back and opened. The bottom-piece 21 is hinged transversely intermediate its front and rear edges, as indicated at 33, on the base 19 so as to be tiltable rearwardly to the extent permitted by the beveled rear end portions 34 of the base. The device is shown in this position in Figs. 2 and 4. The hinging or fulcruming axis 33 is located near enough to the vertical plane through the center of the records 27 in the envelopes 26 so that the operator taking hold of the handle 35 that is provided on the front portion of the bottom piece 21 on the underside will not find it difficult to tilt the file of records. The first movement through a small angle brings the file to a dead-center position, indicated by the center-line *bb* and the file thereafter moves through a further small angularity, aided by gravity, and finally comes to rest on the inclined surface 34. It is because the file moves past the dead-center position that there is no need for any means for locking the file in the tilted position, and the same is, of course, true in regard to the normal upright position shown in Fig. 5. The center lines *cb* and *ab* indicate the opposite extremes of movement of the file relative to the base 19, the included angle between these two lines being equal to the included angle between the bottom 21 and the incline 34 in Fig. 5. To avoid any sudden shock or jar and danger of pinching fingers in the rocking movement of the file, I may provide suitable checking devices, as, for example, the pneumatic dashpots 36 and 37, which are shown as provided in the base 19 and have pistons 38 working therein connected by links 39 to the bottom piece 21 of the file, suitable metering valves (not shown) being provided on these dashpots to regulate the checking action consistent with the weight of the records stored in the file. I also prefer to provide slotted links as shown at 47 in Fig. 6 to limit the opening movement of the side pieces 23 relative to the bottom piece 21, these links being preferably pivoted on the bottom of the side pieces and being slidable relative to studs on the bottom piece to the extent permitted by the slots in the links. While I have shown the record file 14 as provided on a base 19 movable into and out of a cabinet compartment, it should be understood that I do not limit my invention to that specific application, inasmuch as such a file may be provided independently of any cabinet. Also, while I have shown a file tiltable from a vertical position, it should be understood that my invention is not limited to that type, because many of the advantages may be gained by having a file fixed in the reclining position.

Where the purchaser of this type of record file has only a few records to store in it, the reserve supply of empty envelopes 26 is preferably held back out of the way by "flags" or hold-backs 40, preferably made of spring steel, which can be inserted into selected holes 41 provided in the bottom piece 21 in laterally spaced relation near the front thereof, as shown in Fig. 4. If the envelopes containing the records are placed in the envelopes in the middle portion of the file between the empty ones that are held back on both sides of the file, it is obvious that the envelopes containing the records will leaf out when the file is tilted back, making the records therein the more readily identifiable, as clearly shown in Fig. 4. When the record file is in respose, as when moved to the retracted position in the cabinet, the hinged side pieces 23 will ordinarily not require any means for holding them in, but, if desired, I may provide pull-buttons 42 pivotally connected to detents 43 that are pivotally mounted in the bottom piece 21 under the side-pieces 23 and arranged to project into grooves 44 provided therefor in the bottom edges of the side pieces, as illustrated in Fig. 5. In that way, the record file may be kept locked until the buttons 42 are pulled out as illustrated in Fig. 2.

Figure 1:
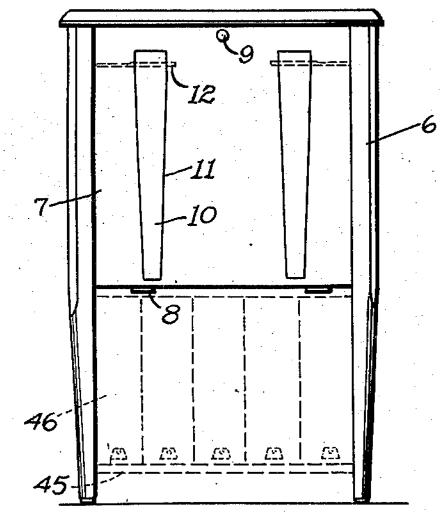
Fig. 1 is a front view of a record file cabinet made in accordance with my invention.

Indicated in dotted lines at 45, in Fig. 1 is a lower shelf in the cabinet 6 for a lower open front compartment in which record albums may be kept, like those indicated in dotted lines at 46. In this way the one cabinet takes care of the storage of individual records and also albums containing groups of records. This arrangement further permits the storage of 10″ records in the upper file, for example, and 12″ records in the albums below, and thus takes care of most phonograph purchasers' requirements.

Figure 7:
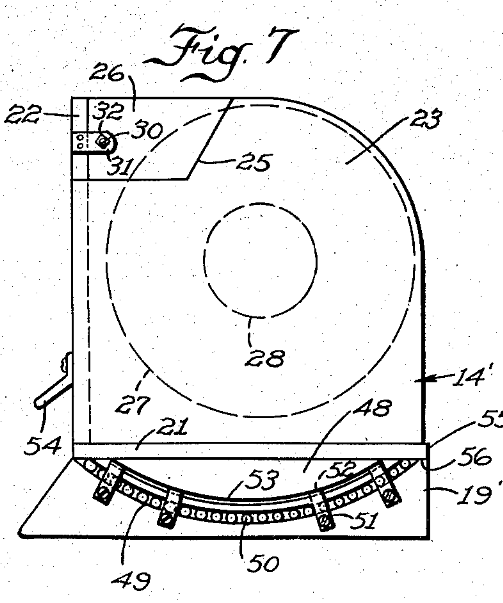
Fig. 7 is a side view of another record file showing a modified or alternative construction.

The file 14′ shown in Fig. 7 is the same as the file 14, but has arcuate runners 48 on the bottom piece 21 working in arcuate tracks or recesses 49 in the base 19′ for tiltably or rotatably mounting the file on the base. If the arcs of the runners 48 have their center coincident with the centers of the records 27 in the envelopes 26 it is clear that the weight of the records is not lifted in moving the file 14′ to reclining position, thus making the operation easier. Rollers 50 may also be provided between the parts to make for still easier operation. Clips 51 fastened to the base 19′ and projecting radially therefrom relative to the runners 48 have inwardly bent ends 52 projecting into arcuate grooves 53 in the sides of the runners, concentric with their arcuate bearing surfaces, to hold the runners in assembled relation to the base 19′ with the rollers 50 therebetween. A stop 54 on the back of the file engages the back of the base, but may be arranged to strike the door 7, to limit the reclining movement of the file. The front end 55 of the bottom piece comes into abutment on top of the base 19' at 56 to limit return movement. Any suitable means may be provided for releasably locking file 14' in both extremes.

In conclusion, although I have shown legs 10 designed to swing downwardly from the door 7 for its support, it should be clear that I may provide other supporting means, as, for example, I may provide two vertically hinged doors for the lower compartment 45 swingable outwardly into parallelism to one another, having their bottom edges in close proximity to the floor and their upper edges in close proximity to the bottom of the door 7 in its opened position, whereby the lower doors may themselves form supports for the door 7. However, in order to allow for the difference in clearances beneath the lower doors, required for different floor coverings, I may provide vertical slidable legs on the outer ends of these doors spring pressed upwardly to a limited extent, but arranged to be depressed by the door 7 to rest on the floor covering, so as to support the door 7 on these slidable legs, using the lower doors only as guides for these slidable legs.

It is believed the foregoing description conveys a good understanding of the objects and advantages of my invention. The appended claims have been drawn to cover all legitimate modifications and adaptations.

I claim:

1. In a device of the character described, a cabinet open on one side and having a closure hinged to swing outwardly and downwardly to a substantially horizontal position, a record file carriage movable out of said cabinet on top of said closure in its horizontal position, means for supporting the closure in its horizontal position, and a record file comprising a rigid bottom tiltably mounted on said carriage, an upwardly projecting rigid back carried on said bottom, and envelopes to contain disc records swingably supported by their substantially vertical rear edge portions on said back.

2. In a device of the character described, a cabinet open on one side and having a closure hinged to swing outwardly and downwardly to a substantially horizontal position, a record file carriage movable out of said cabinet on top of said closure in its horizontal position, means for supporting the closure in its horizontal position, and a record file comprising a rigid bottom tiltably mounted on said carriage, an upwardly projecting rigid back carried on said bottom, envelopes to contain disc records swingably supported by their substantially vertical rear edge portions on said back, and sides of relatively nonflexible material hinged at their rear edge portions to said back on the opposite sides thereof.

3. A record storage file comprising a rigid bottom tiltably supported on a base, an upwardly projecting rigid back carried on said bottom, and envelopes to contain disc records swingably supported by their substantially vertical rear edge portions on said back.

4. A record storage file comprising a rigid bottom tiltably supported on a base, an upwardly projecting rigid back carried on said bottom, envelopes to contain disc records swingably supported by their substantially vertical rear edge portions on said back, and sides of relatively nonflexible material hinged at their rear edge portions to said back on the opposite sides thereof.

5. A record storage file comprising a rigid bottom tiltably supported on a base, an upwardly projecting rigid back carried on said bottom, envelopes to contain disc records swingably supported by their substantially vertical rear edge portions on said back, sides of relatively nonflexible material hinged at their rear edge portions to said back on the opposite sides thereof, and means for releasably locking said sides in rigid relation to said bottom and substantially parallel relation to one another.

6. A record storage file comprising a rigid bottom tiltably supported on a base, an upwardly projecting rigid back carried on said bottom, and envelopes to contain disc records swingably supported by their substantially vertical rear edge portions on said back, the fulcrum point for tilting movement of said bottom being behind the vertical plane through the centers of the records but in a vertical plane that projects upwardly within the radius of the records.

7. A record storage file comprising a rigid bottom tiltably supported on a base, an upwardly projecting rigid back carried on said bottom, and envelopes to contain disc records swingably supported by their substantially vertical rear edge portions on said back, the bottom having arcuate runners the center of which is substantially coincident with the center of disc records disposed in said envelopes, and said carriage having arcuate tracks thereon on which said runners operate for rotary tilting support of said file.

8. A record storage file comprising a rigid bottom tiltably supported on a base, an upwardly projecting rigid back carried on said bottom, envelopes to contain disc records swingably supported by their substantially vertical rear edge portions on said back, and shock absorbing means yieldably resisting tilting movement of said file.

9. A record storage file comprising a rigid bottom tiltably supported on a base, an upwardly projecting rigid back carried on said bottom, envelopes to contain disc records swingably supported by their substantially vertical rear edge portions on said back, sides of relatively nonflexible material hinged at their rear edge portions to said back on the opposite sides thereof, and means for positively limiting opening movement of said sides.

JOSEPH HAMMOND.

REFERENCES CITED

The following references are of record in the file of this patent:

UNITED STATES PATENTS

| Number | Name | Date |
|---|---|---|
| 1,778,877 | Williams | Oct. 21, 1930 |
| 1,933,144 | Karp | Oct. 31, 1933 |

FOREIGN PATENTS

| Number | Country | Date |
|---|---|---|
| 546,692 | Germany | Sept. 7, 1930 |
| 754,125 | France | Aug. 21, 1933 |